United States Patent
Fujii et al.

(10) Patent No.: US 10,812,383 B2
(45) Date of Patent: Oct. 20, 2020

(54) COMMUNICATION APPARATUS AND COMMUNICATION METHOD

(71) Applicant: MITSUBISHI ELECTRIC CORPORATION, Tokyo (JP)

(72) Inventors: Teruko Fujii, Tokyo (JP); Yosuke Yokoyama, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 118 days.

(21) Appl. No.: 15/759,923

(22) PCT Filed: Nov. 5, 2015

(86) PCT No.: PCT/JP2015/081113
§ 371 (c)(1),
(2) Date: Mar. 14, 2018

(87) PCT Pub. No.: WO2017/077613
PCT Pub. Date: May 11, 2017

(65) Prior Publication Data
US 2018/0270151 A1     Sep. 20, 2018

(51) Int. Cl.
*H04L 12/741* (2013.01)
*H04L 29/06* (2006.01)
(Continued)

(52) U.S. Cl.
CPC .......... *H04L 45/745* (2013.01); *H04L 45/54* (2013.01); *H04L 45/58* (2013.01); *H04L 45/60* (2013.01); *H04L 69/16* (2013.01); *H04L 69/22* (2013.01)

(58) Field of Classification Search
CPC ......... H04L 45/54; H04L 45/58; H04L 45/60; H04L 45/745; H04L 69/16; H04L 69/22
See application file for complete search history.

(56) References Cited

U.S. PATENT DOCUMENTS 7,554,992 B2    6/2009    Kimura et al.
8,145,788 B1    3/2012    Love et al.
(Continued)

FOREIGN PATENT DOCUMENTS

EP    2306676 A1    4/2011
JP    10-013462 A    1/1998
(Continued)

OTHER PUBLICATIONS

International Search Report (PCT/ISA/210) issued in PCT/JP2015/081113, dated Dec. 28, 2015.
(Continued)

*Primary Examiner* — Davoud A Zand
(74) *Attorney, Agent, or Firm* — Birch, Stewart, Kolasch & Birch, LLP.

(57) ABSTRACT

A communication apparatus 1 is provided with a first communication interface 11, second communication interfaces 12 connected to a plurality of access routers 3 connected to an Internet 6, and a route determination unit which, for a packet being communicated from the first communication interface 11 to the second communication interfaces 12, determines the second communication interface 12 in accordance with an elapsed time since connecting start of a connection with a destination of the packet. Connections having started within a predetermined time are treated as connections constituting one user session. Therefore, connections constituting the same user session can be communicated via the same access router without the need of analyzing a protocol of a layer.

7 Claims, 14 Drawing Sheets

(51) Int. Cl.
*H04L 12/773* (2013.01)
*H04L 12/775* (2013.01)

(56) References Cited

U.S. PATENT DOCUMENTS

| | | | |
|---|---|---|---|
| 8,769,127 B2* | 7/2014 | Selimis | H04L 67/06 709/229 |
| 2003/0185151 A1 | 10/2003 | Kurosawa et al. | |
| 2004/0004969 A1 | 1/2004 | Ohta | |
| 2004/0152439 A1 | 8/2004 | Kimura et al. | |
| 2007/0207591 A1* | 9/2007 | Rahman | H04L 45/00 438/439 |
| 2007/0282951 A1* | 12/2007 | Selimis | H04L 67/06 709/205 |
| 2008/0031262 A1* | 2/2008 | Nishizaki | H04L 49/3027 370/395.71 |
| 2011/0078313 A1* | 3/2011 | Radulescu | H04L 45/125 709/227 |
| 2012/0236739 A1 | 9/2012 | Wang | |
| 2014/0148205 A1* | 5/2014 | Grinshpun | H04L 69/16 455/466 |
| 2014/0355442 A1* | 12/2014 | Isobe | H04L 69/16 370/235 |

FOREIGN PATENT DOCUMENTS

| | | |
|---|---|---|
| JP | 2011-097458 A | 5/2011 |
| JP | 2012/099961 A | 5/2012 |
| WO | WO 03/007160 A1 | 1/2003 |
| WO | WO 2004/006518 A1 | 1/2004 |

OTHER PUBLICATIONS

Office Action issued in Japanese Patent Application No. 2016-510331, dated Apr. 12, 2016.

Okayama et al., "A Transparent Dynamic Traffic Balancing on Multihomed Networks", Journal of the Information Processing Society of Japan, and Information Processing Society of Japan, vol. 41, No. 12, Dec. 15, 2000, pp. 3255-3264.

* cited by examiner

Fig. 5

| PROTOCOL TYPE | LOCAL IP ADDRESS | LOCAL PORT NUMBER | REMOTE IP ADDRESS | REMOTE PORT NUMBER | COMMUNI-CATION TRAFFIC | INTERFACE ID |
|---|---|---|---|---|---|---|
| TCP | 192.168.30.2 | 54903 | 135.141.74.25 | 80 | 5Mbps | 1 |
| TCP | 192.168.30.2 | 54905 | 135.141.74.25 | 80 | 5Mbps | 2 |
| UDP | 192.168.30.2 | 54925 | 135.141.74.10 | 100 | 20Mbps | 1 |
| TCP | 192.168.30.3 | 54905 | 135.141.74.25 | 80 | 5Mbps | 1 |

Fig. 6

| SECOND COMMUNICATION INTERFACE ID | TYPE | COMMUNICATION SPEED | COMMUNICATION TRAFFIC FREE VOLUME |
|---|---|---|---|
| 1 | LTE | 75Mbps | 45Mbps |
| 2 | 3G | 7Mbps | 2Mbps |
| | | | |
| | | | |

Fig. 7

| TIMER OPERATION STATUS | SELECTION INTERFACE ID |
|---|---|
| OPERATING | 1 |

| PORT NUMBER | SELECTION INTERFACE ID |
|---|---|
| 80 | 1 |
| 512 | 2 |
| ... | ... |

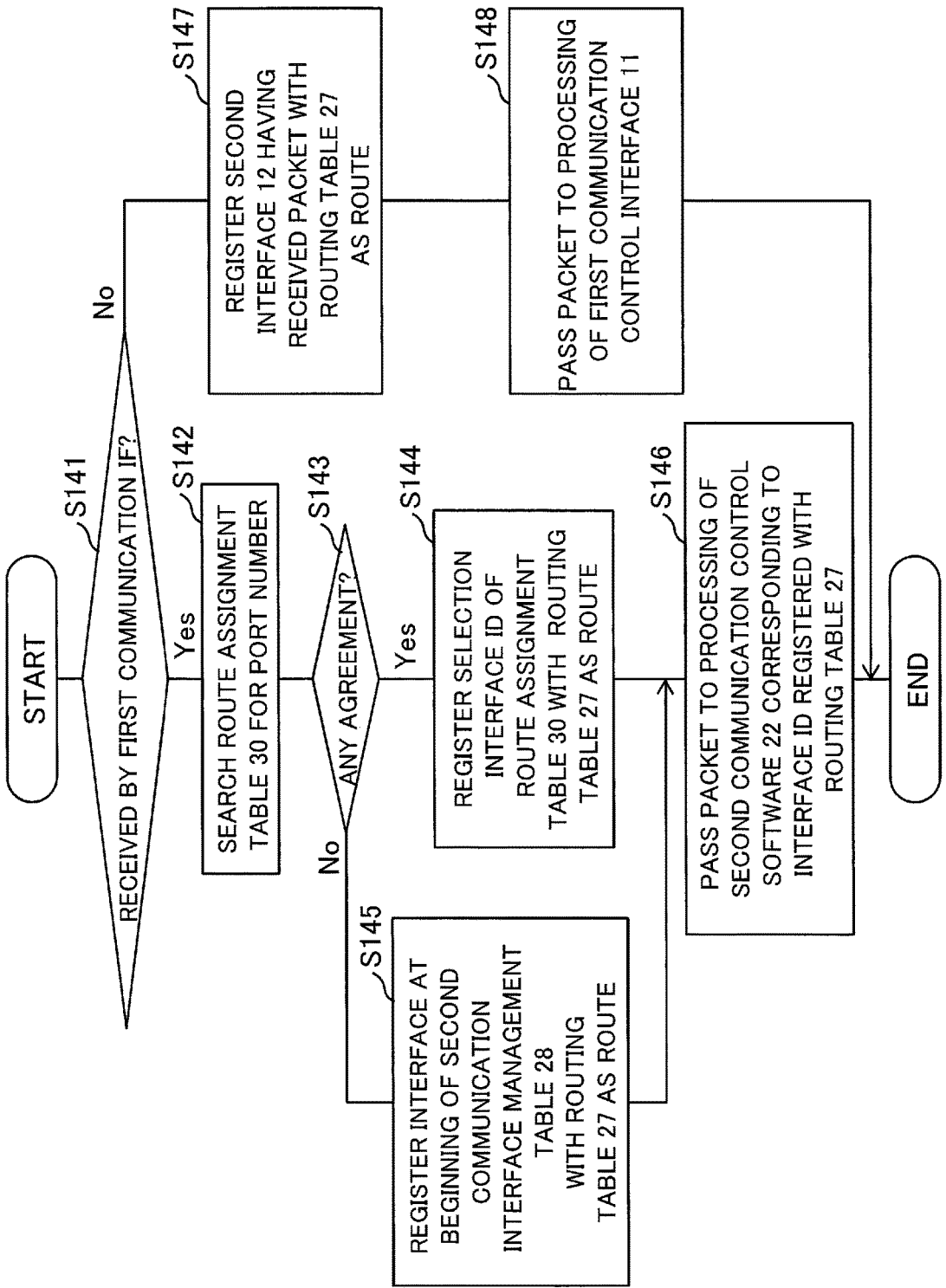

COMMUNICATION APPARATUS AND COMMUNICATION METHOD

TECHNICAL FIELD

The present invention relates to a communication apparatus and a communication method.

BACKGROUND ART

A conventional communication apparatus identifies user sessions with using as a key, user identification information in a layer-7 protocol such as HTTP, and distributes the user sessions such that the same user session is communicated via the same route, thereby realizing load distribution in cases where a plurality of communication interfaces and a plurality of routes exist (For example, patent Literature 1).

Another method (for example, Patent Literature 2) has also been proposed. When a reception packet is received by one of a plurality of communication interfaces, the source address and communication interface are stored. When a packet for that address is received from another communication interface, the packet is transmitted from the communication interface whose address has been stored. Thus, a reverse packet corresponding to the initially received packet is relayed along the same route.

CITATION LIST

Patent Literature

Patent Literature 1: WO2003-007160
Patent Literature 2: JP2011-97458 A

SUMMARY OF INVENTION

Technical Problem

In a conventional communication apparatus, for discriminating the user session of a packet, separate processing to examine the contents of the relay packet is required for each of protocols that are many in order to analyze the protocol of the upper layer. Therefore, the packet inspection processing amount is large in such relay. This causes a relay delay and a decrease in relay performance when a popular-edition relaying device to be installed in an automobile or used in the home is implemented in a software manner. Furthermore, since a packet inspection differs among protocols of the upper layer, it cannot cope with a protocol not disclosed in detail and a new protocol in the future.

The present invention has been made to solve the above problems, and has as its objective to carry out relay of packets constituting a user session along the same route regardless of on an upper layer.

Solution to Problem

In order to solve the above problems and to achieve the above objective, the present invention is provided with a first communication interface, second communication interfaces connected to a plurality of access routers connected to an Internet, and a route determination unit which determines, as a relay route, the second communication interface corresponding to one of the plurality of access routers, with using information of time or connecting of communication that can determine a route when a head packet indicating connecting start of a connection relayed by using the first communication interface and one second communication interface or one of the plurality of second communication interfaces is received.

Advantageous Effects of Invention

Since the apparatus according to the present invention comprises the above configuration, the load can be distributed and simultaneously the connections constituting the same user session can be communicated via the same access router without the need of analyzing the protocol of the upper layer.

BRIEF DESCRIPTION OF DRAWINGS

FIG. 5 illustrates an example of a routing table 27 in Embodiment 1.
FIG. 6 illustrates an example of a second communication interface management table 28 in Embodiment 1.
FIG. 7 illustrates an example of a timer management table 26 in Embodiment 1.
FIG. 13 is a diagram illustrating a route assignment table 30 of Embodiment 3.
FIG. 14 is a flowchart illustrating processing of route determination software 23 in Embodiment 3.

DESCRIPTION OF EMBODIMENTS

Embodiments of a communication apparatus according to the present invention will be described in detail with reference to drawings. Note that the present invention is not limited by the embodiments.

Embodiment 1

Figure 1:
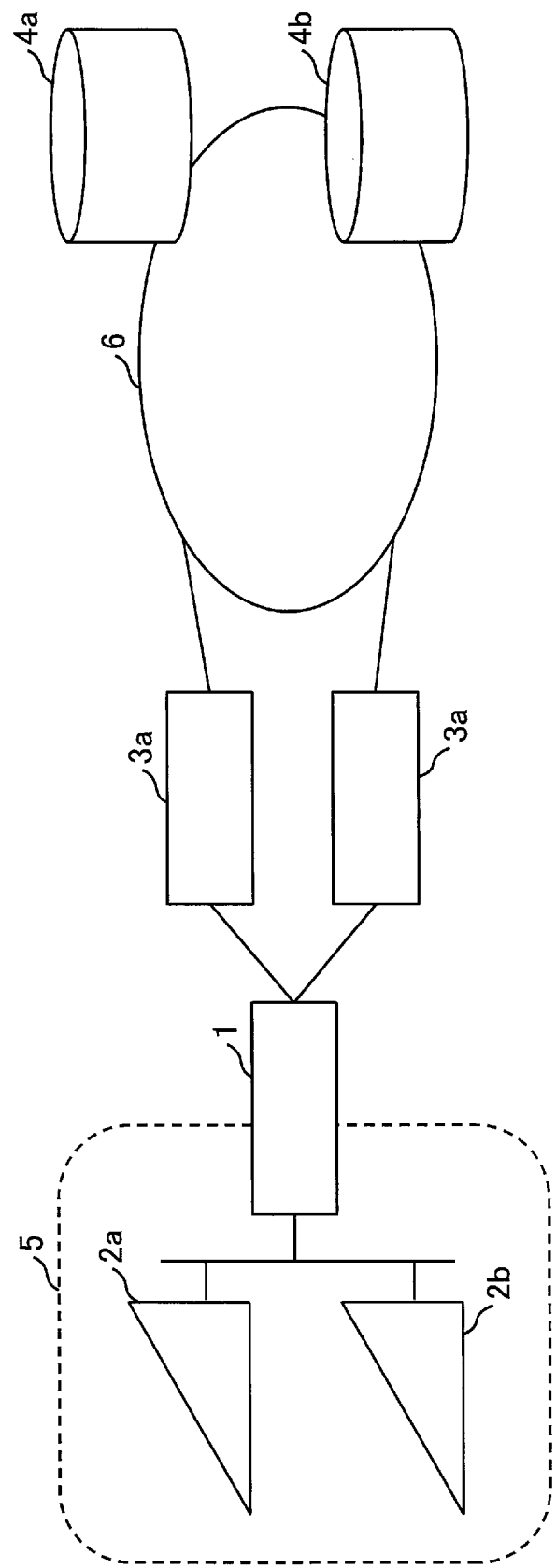
FIG. 1 is a system configuration diagram illustrating a communication network in Embodiment 1.

FIG. 1 is a system configuration diagram illustrating a communication network in Embodiment 1.

The network of FIG. 1 is constituted of a communication apparatus 1, communication terminals 2 connected by wire or wireless link in a local network 5 connected to the communication apparatus 1, access routers 3 connected by wire or wireless link to the communication apparatus 1 independently of the local network 5, and servers 4 connected to the access routers 3 via the Internet 6.

The communication apparatus 1 has a function of distributing the communication among a plurality of routes communicating via a plurality of access routers 3a and 3b and relaying the communication between communication terminals 2a and 2b included in the local network 5 and remote servers 4a and 4b, thereby distributing the communication load.

The communication terminals 2a and 2b belong to the local network 5 and have a function of communicating with the remote servers 4a and 4b via the communication apparatus 1, the access routers 3a and 3b, and the Internet 6.

FIG. 1 illustrates a case where two communication terminals 2 are provided. Alternatively, a single terminal may be provided, or three or more terminals may be provided on the contrary.

The access routers 3a and 3b are access routers that provide communication with the Internet 6 by using a function such as NAT (Network Address Translation) or NAPT (Network Address Port Translation).

FIG. 1 illustrates a case where two access routers 3 are provided. Alternatively, three or more access routers may be provided.

The servers 4a and 4b communicate with the communication terminals 2 via the Internet 6 to provide various types of services.

FIG. 1 illustrates a case where two servers 4a and 4b are provided. Alternatively, a single server 4 may be provided, or three or more servers may be provided on the contrary.

FIG. 1 illustrates a client-server system as an example that provides a service to the communication terminals 2a and 2b. Alternatively, a system that provides a service to the communication terminals 2a and 2b may be implemented by a cloud service.

The local network 5 is a network in a private, small-size local environment such as a private house or an automobile and is constituted of the communication terminals 2a and 2b and the communication apparatus 1.

The Internet 6 is a wide area public network which provides packet communication between the communication terminal 2 constituting the local network 5, and a remote server.

A communication method will now be described made which, in case of communication from one or more communication terminals 2 to one or more servers 4 and so on existing on the Internet 6, enables communication to connect to a plurality of access routers 3 without relying on a layer.

The communication apparatus 1 will be described in detail.

Figure 2:
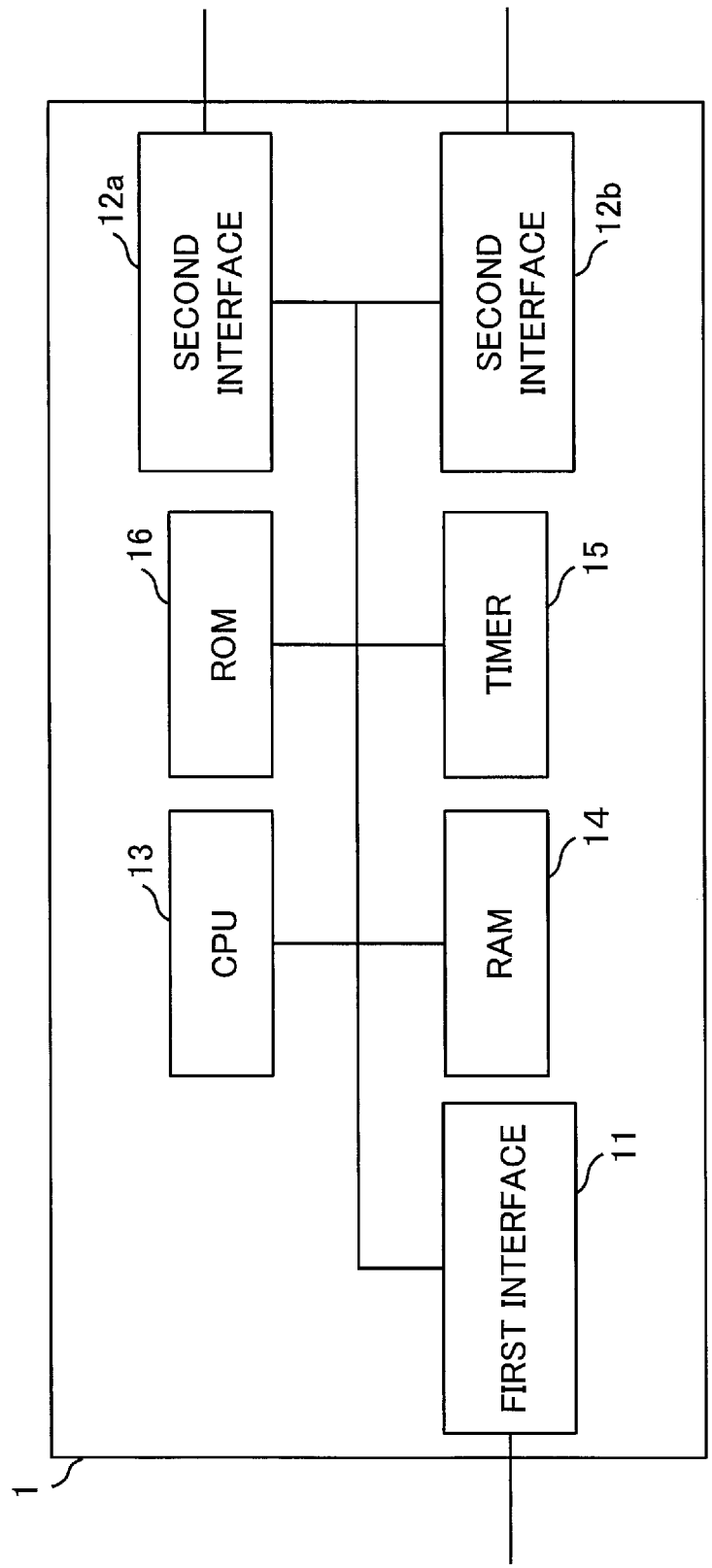
FIG. 2 is a configuration diagram illustrating a hardware configuration of a communication apparatus 1 in Embodiment 1.

FIG. 2 is a configuration diagram illustrating a hardware configuration of the communication apparatus 1 in Embodiment 1.

Referring to FIG. 2, a first communication interface 11 is a communication unit to communicate with the communication terminal 2 via the local network 5. For example, the local network 5 is constituted using a wireless LAN, Ethernet, Bluetooth, or the like, and can be implemented with using a dedicated LSI, FPGA, or the like as its communication interface.

Second communication interfaces 12a and 12b are interface units to communicate with the access routers 3a and 3b in FIG. 1. For example, communication between the communication apparatus 1 and the access routers 3a and 3b is carried out with using a USB, a wireless LAN, Ethernet (registered trademark), or Bluetooth (registered trademark), and can be implemented with using a dedicated LSI, FPGA, or the like as the communication interface for the communication. This embodiment indicates an example in which the second communication interface 12a and the access router 3a are connected to each other and the second communication interface 12b and the access router 3b are connected to each other. One second communication interface 12 may suffice if the function to be described hereinafter is secured by connecting two access routers to one second communication interface 12.

A CPU 13 is a CPU (Central Processing Unit) that processes the operation of the communication apparatus 1 in a software manner.

A RAM 14 being a Random Access Memory is used as a communication buffer that loads software to be executed by the CPU 13 from a ROM 16 being a Read Only Memory and temporarily stores communication data received from the first communication interface 11 and the second communication interfaces 12a and 12b.

A timer 15 produces a time-out at a time interval set by the CPU 13 and notifies the time-out to the CPU 13.

The ROM 16 serves to store the software running in the CPU 13, and so on.

An example of the software configuration of the communication apparatus 1 will now be described.

Figure 3:
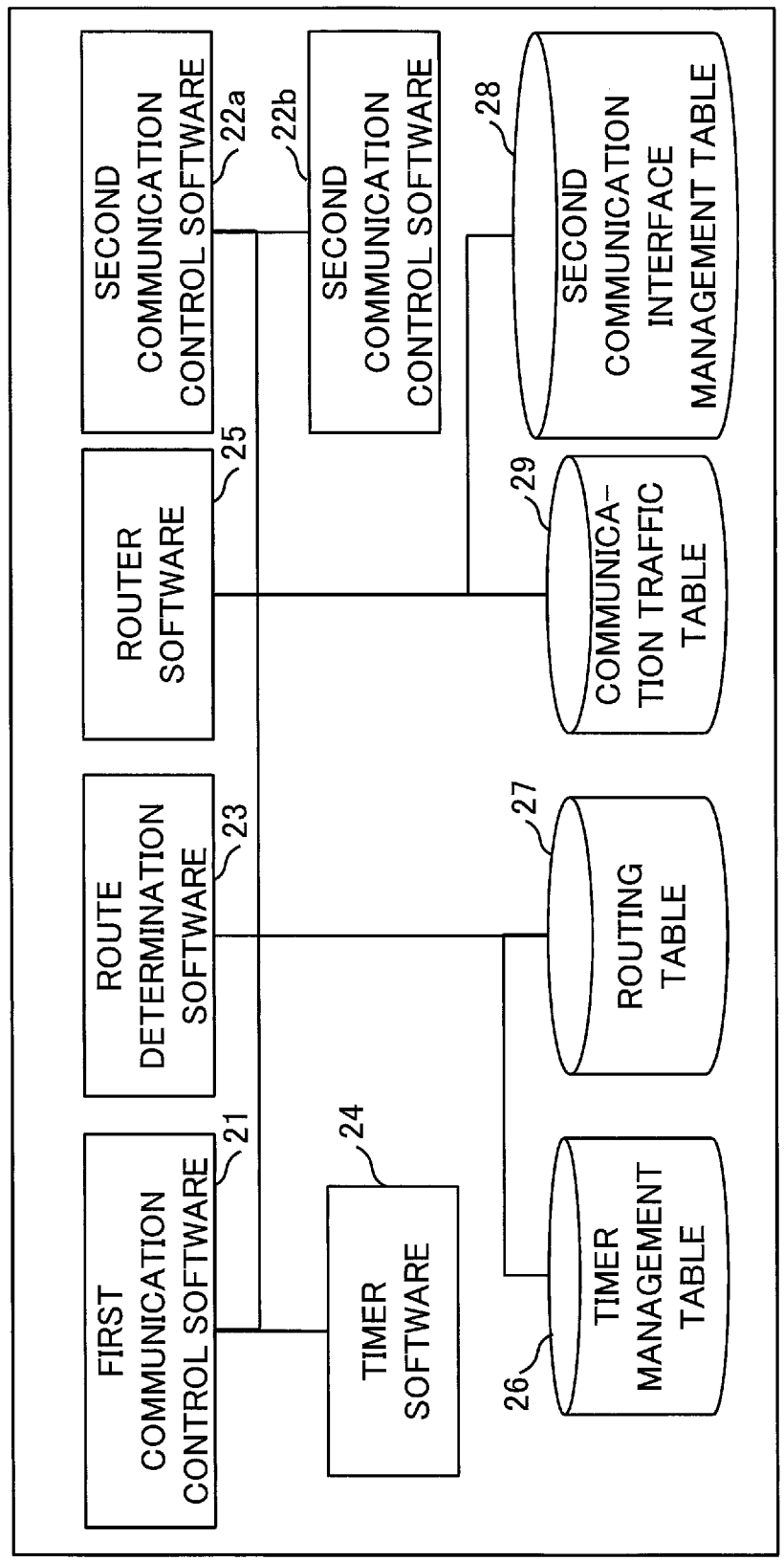
FIG. 3 is a software configuration diagram of the communication apparatus 1 in Embodiment 1.

FIG. 3 is a software configuration diagram of the communication apparatus 1 in Embodiment 1.

First communication control software 21 is software for communication control processing that controls the first interface 11 to transmit and receive data to and from the local network 5. The processing (first communication control unit) of the first communication control software 21 is carried out by the CPU 13, or by a processing circuit or FPGA in the first communication interface 11.

Second communication control processing software 22a and 22b are software for communication control processing that respectively control the second communication interfaces 12a and 12b to transmit and receive data to and from the connected access routers 3a and 3b. The processing (second communication control unit) of the second communication control processing software 22 is carried out by the CPU 13, or by a processing circuit or FPGA in the first communication interface 12.

If the second communication interface 12 can be constituted of a single communication interface, the number of pieces of second communication control processing software 22 included in the second communication interface 12 is determined according to the number of access routers 3.

For a new connection, route determination software 23 determines the route employed for communication with the server 4 on the Internet 6, that is, which one between the second communication interfaces 12a and 12b employed for communication will be used. The processing (route determination unit) of the route determination software 23 is carried out by the CPU 13. Note that UDP (User Datagram Protocol) is a connectionless-type protocol. For the sake of descriptive convenience, a series of communications of UDP from the start till the end will be described as a connection, in the same manner as with TCP (Transmission Control Protocol).

Timer software 24 is software activated by the processing of the route determination software 23 and notifies a designated time lapse for the processing of the route determination processing software 23. The processing (timer processing unit) of the timer software 24 is carried out by the timer 15 and the CPU 13.

Router software 25, in accordance with the contents of a routing table 27, relays of a packet outputted from the processing of the first communication control software 21 and received, so that the packet is processed by either the second communication control software 22a or 22b. The router software 25 also outputs the packet received by the processing of the second communication control software 22a and 22b for the processing of the first communication control software 21. The processing (router processing unit) of the router software 25 is carried out by the CPU 13.

A timer management table 26 is a table that manages the operation status and so on of the timer.

The routing table 27 is a table where the second communication interfaces 12a and 12b used for communication with the server 4, for each TCP or UDP connection are written. The timer management table 26 is mainly stored in the RAM 14.

A second communication interface management table 28 is a table where connections which currently use the second communication interfaces 12a and 12b as communication routes, and the communication traffic of the connections are written. The second communication interface management table 28 is mainly stored in the RAM 14.

A communication traffic table 29 is a table where well-known port (port used by major protocols of TCP/IP) numbers and the communication traffic corresponding to the well-known port numbers are written. The communication traffic table 29 is registered in the communication apparatus 1 in advance. The communication traffic table 29 is stored in the RAM 14 or ROM 16.

The operation in this embodiment will be described.

Figure 4:
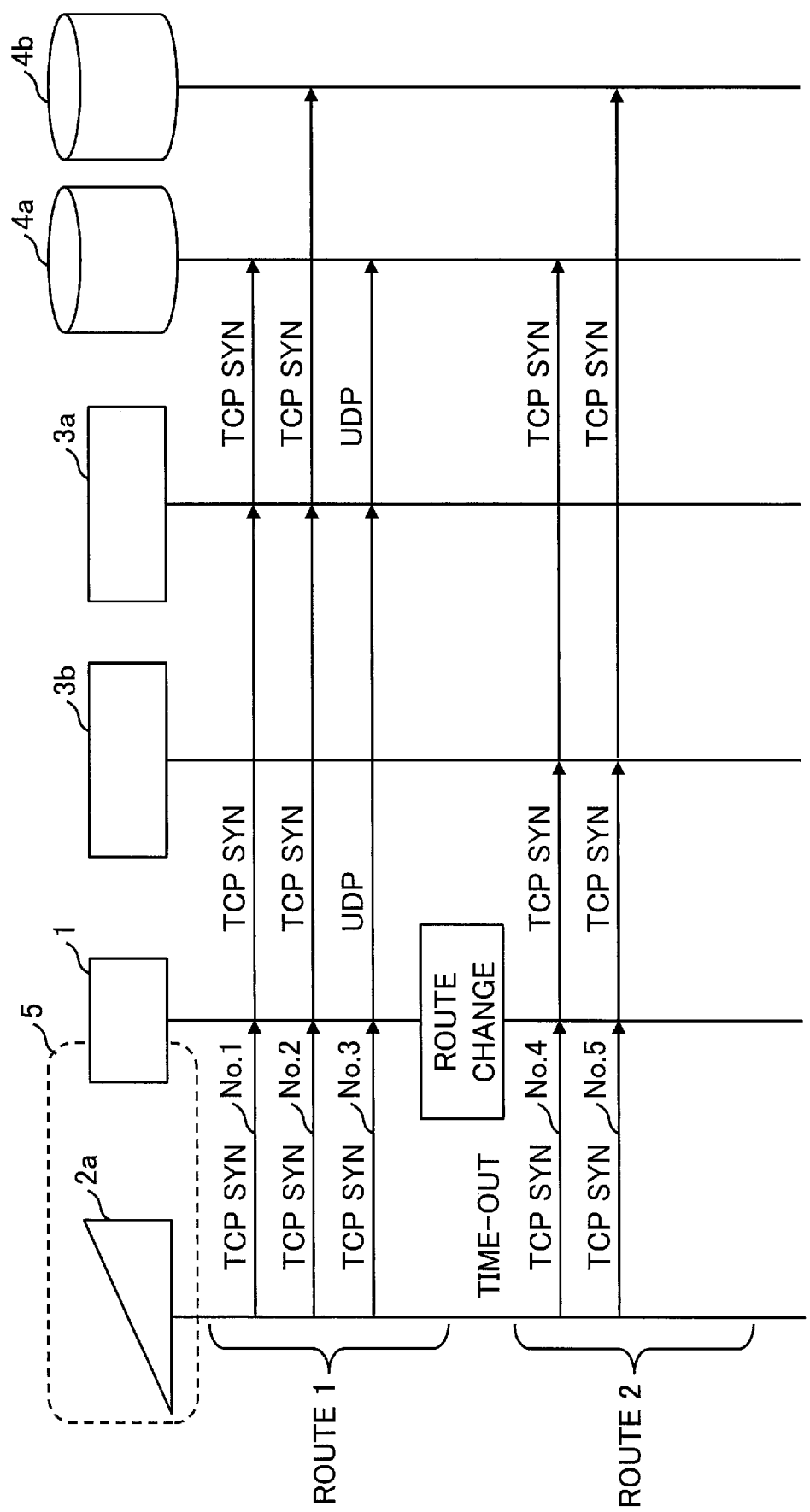
FIG. 4 is a sequence diagram illustrating an operation of route determination in Embodiment 1.

FIG. 4 is a sequence diagram illustrating an operation of route determination in Embodiment 1.

Referring to FIG. 4, the communication apparatus 1, the communication terminal 2a, the access routers 3a and 3b, the servers 4a and 4b, and the local network 5 are identical with those in FIG. 1. Each of packet sequences Nos. 1 to 5 indicates the first one packet of each connection. In FIG. 4, only the first one packet of each connection is illustrated for easy understanding.

FIG. 4 will be described in detail separately in describing the operation.

FIG. 5 illustrates an example of the routing table 27 in Embodiment 1.

A protocol type 51 indicates either TCP or UDP.

A local IP address 52 is the IP address of a local network-side terminal of the connection.

A local port number 53 is the port number of the TCP or UDP of the local network-side terminal used by this connection.

A remote IP address 54 is the IP address of the server of this connection. A remote port number 55 is the port number of the TCP or UDP used by the server in this connection.

A communication traffic 56 indicates the communication traffic per unit time of the connection. The communication traffic changes according to the situation of the line of from the second interface 12 through the access router 3 and from the access router 3 through the Internet 6.

An interface ID 57 is an identifier indicating the interface employed when transmitting the packet of this connection to the server.

FIG. 6 illustrates example of the second communication interface management table 28 in Embodiment 1.

A second communication interface ID 61 is an identifier for identifying the second communication interface.

A type 62 indicates a communication means employed by the access routers 3a and 3b for communicating with the Internet 6.

A communication speed 63 indicates a communication speed between the access routers 3a and 3b and the Internet 6.

A communication traffic free volume 64 is an estimate of the communication traffic free volume of the interface which is obtained by subtracting the communication traffic needed by the connection which currently uses this interface, from the communication speed 63.

FIG. 7 illustrates an example of the timer management table 26 in Embodiment 1.

A timer operation status 71 indicates the operation status of the timer 15, which is either operating or stopped.

A selection interface ID 72 indicates the communication interface ID (that is, the second communication interface 12a or 12b in the case of this embodiment) selected as the communication route of a packet addressed to the server.

The operation will now be described in detail.

Figure 8:
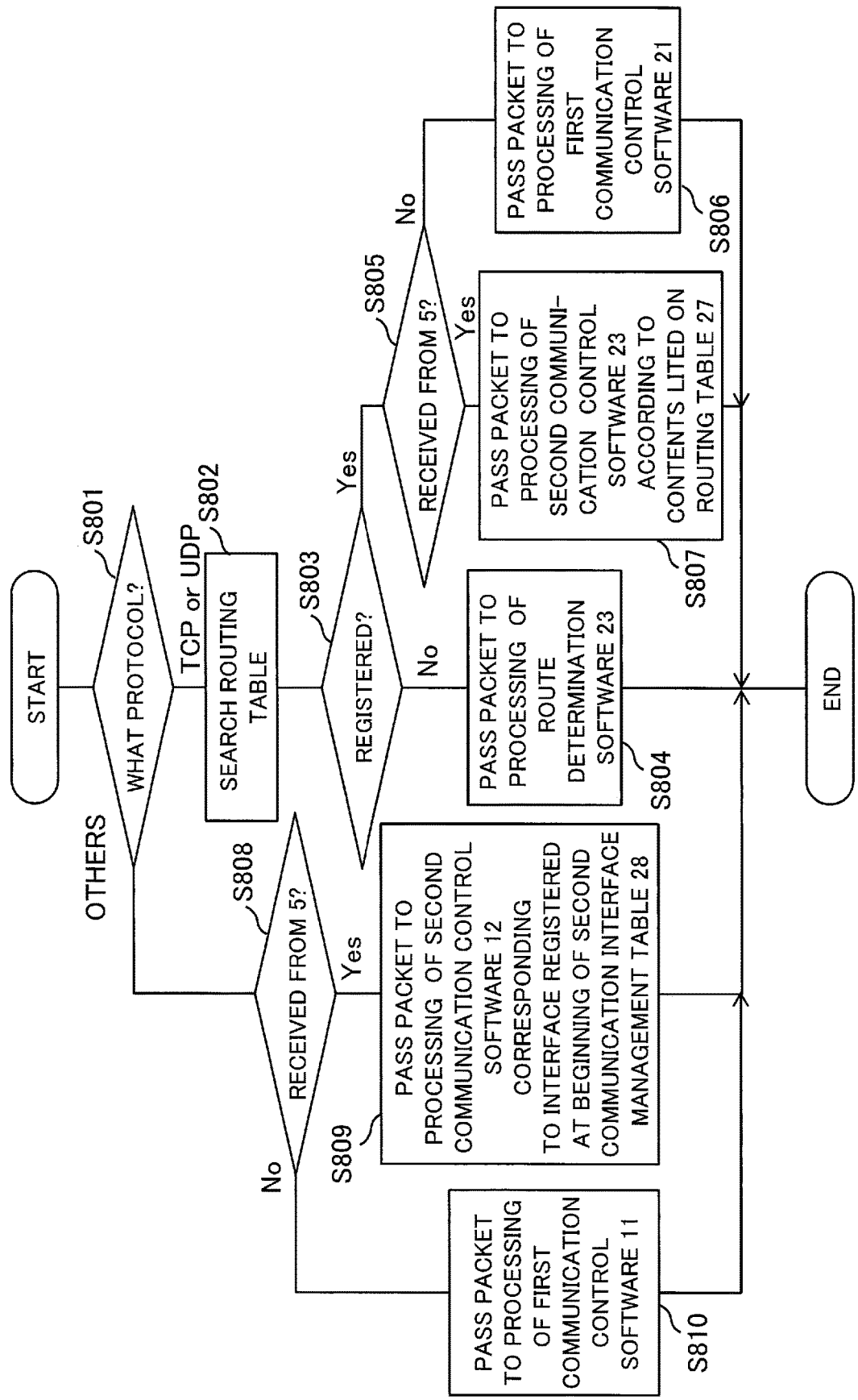
FIG. 8 is a flowchart illustrating processing of router software 25 in Embodiment 1.

FIG. 8 is a flowchart illustrating the processing of the router software 25 in Embodiment 1.

Figure 9:
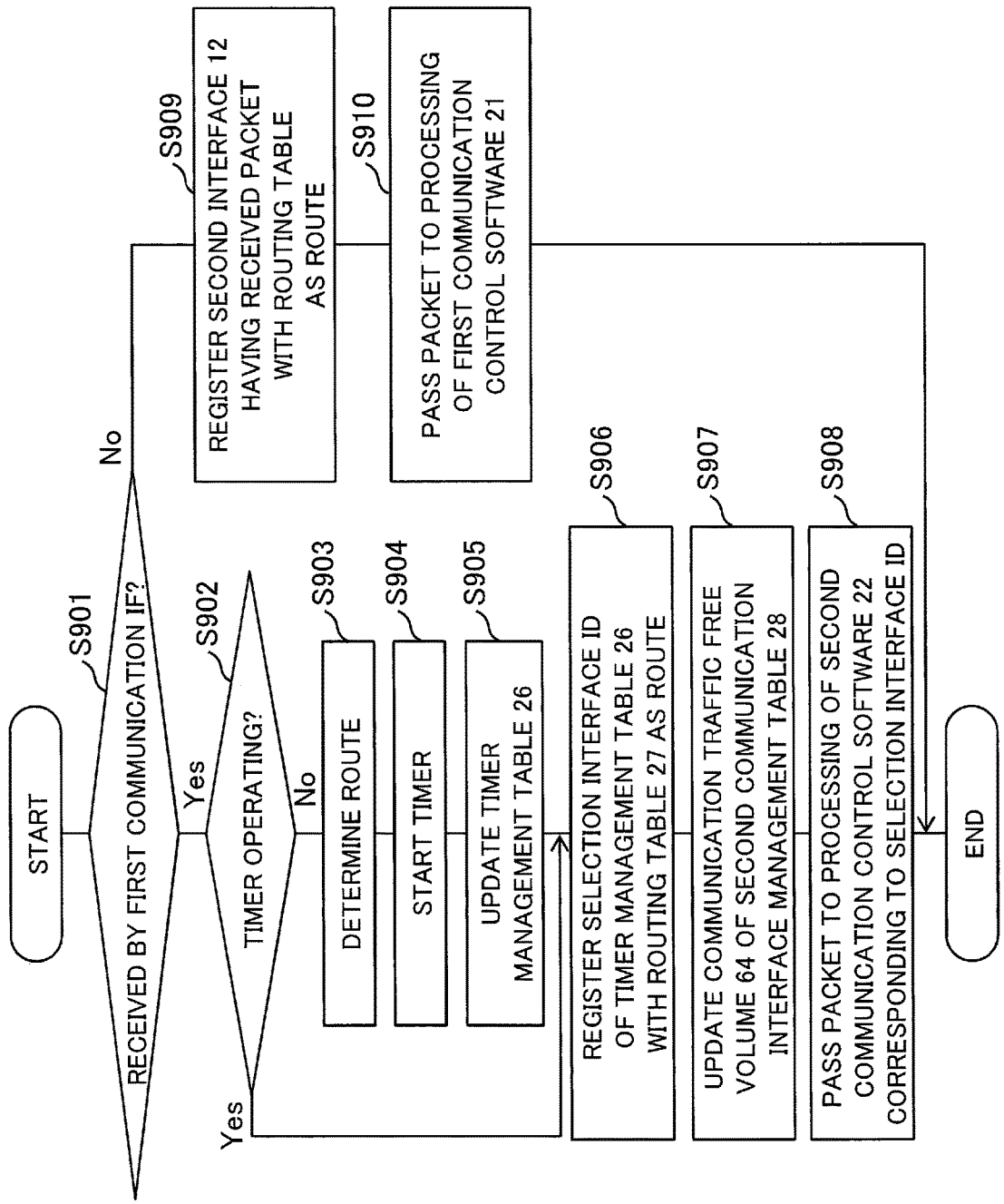
FIG. 9 is a flowchart illustrating processing of route determination software 23 in Embodiment 1.

FIG. 9 is a flowchart illustrating the processing of the route determination software 23 in Embodiment 1.

Figure 10:
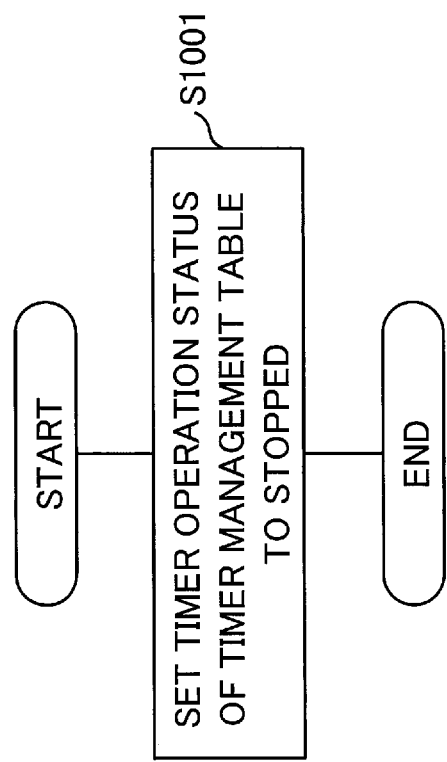
FIG. 10 is a flowchart illustrating processing of timer software 24 in Embodiment 1.

FIG. 10 is a flowchart illustrating the processing of the timer software 24 in Embodiment 1.

The operation of the packet No. 1 in FIG. 4 will be described first.

Initially, the packet No. 1 is received by the first communication interface 11 of the communication apparatus 1 from the communication terminal 2a via the local network 5. Then, the packet No. 1 is passed to the processing of the router software 25 by the processing of the first communication control software 21. Note that TCP SYN in FIG. 4 is a packet to establish connecting by TCP. The packet No. 1 is a packet to be transmitted from the communication terminal 2a to the server 4a via the access router 3a in order to establish connecting by TCP.

With the processing of the router software 25 in the communication apparatus 1, the processing of the packet No. 1 is performed according to the flowchart of FIG. 8.

The processing of the router software 25 is as follows. Upon reception of the packet, in step 801, the IP address of the packet is examined to determine whether the protocol is one of TCP and UDP, or other protocol.

If the protocol is one of TCP and UDP, then in step 802, the routing table 27 is looked up to search for an interface ID 57 having a protocol type 51, local IP address 52, local port number 53, remote IP address 54, and remote port number 55 that agree.

If an interface ID 57 that agrees is not found in step 803, then in step 804, the packet is passed to the processing of the route determination software 23.

The processing of the route determination software 23 will be described according to the flow of FIG. 9.

The processing of the route determination software 23 is as follows. Upon reception of the packet No. 1, it is checked in step 901 whether the interface where the packet No. 1 has been received is the first interface 11.

The packet No. 1 has been received by the side of the first interface 11. Thus, it is checked in step 902 whether the timer operation status 71 of the timer management table 26 represents operating.

When the communication apparatus 1 initially receives a packet, the timer 15 has been stopped. Accordingly, when processing the packet No. 1, the timer 15 is stopped. Hence, the processing proceeds to step 903 to determine the route used for transmission to the server 4a. More specifically, the interface having the largest communication traffic free volume 64 in the second communication interface management table 28 is selected.

Subsequently, in step 904, the timer 15 is started such that the timer 15 times out after a prescribed time. The prescribed time is a time sufficient for receiving all head packets of a plurality of connections that are established when the user session is started.

Then, in step 905, the timer operation status 71 of the timer management table 26 is changed to represent operating. The value of the second communication interface ID 61 selected in step 903 is written in the selection interface ID 72.

Subsequently, in step 906, the connection of the packet No. 1 is added to the routing table 27. First, the IP header of the packet No. 1 is examined. TCP or UDP is written in the protocol type 51. The local IP address 52, the local port number 53, the remote IP address 54, and the remote port number 55 are recorded. In the case of the packet No. 1, TCP is written in the protocol type 51. The packet No. 1 is the packet received by the first communication interface 11. Thus, the source IP address and the source port number are written in the local IP address 52 and the local port number 53, respectively, and the destination IP address and the destination port number are written in the remote IP address 54 and the remote port number 55, respectively. As for the communication traffic 56, the communication traffic table 29 is searched with referring to the port number of the packet No. 1, and corresponding communication traffic is written. If corresponding communication traffic is not found, a predetermined fixed value is written.

The selection interface ID 72 of the timer management table 26 is written in the interface ID 57. Thereafter, packets belonging to this connection are relayed according to the information registered in this routing table 27.

Subsequently, in step 907, the communication traffic 56 of the routing table 27 is subtracted from the communication traffic free volume 64 of the second communication interface management table 28.

Subsequently, in step 908, the packet No. 1 is passed to the processing of the second communication control software 22 corresponding to the selection interface ID 72. As an example, assume that the packet No. 1 is passed to the second communication control software 22a.

Finally, the second communication control software 22a transmits the packet to the access router 3a so that the packet is relayed to the server 4a.

When the packet No. 1 reaches the server 4a, the server 4a transmits a response packet. The response packet is received by the second communication interface 12a of the communication apparatus 1 via the access router 3a. With the processing of the second communication control software 22a, the packet is passed to the processing of the router software 25.

The processing of the router software 25 is performed according to the flowchart illustrated in FIG. 8. The processing of the router software 25 is as follows. Upon reception of the response packet, the IP address of the packet is examined in step 801 to determine whether the protocol is one of TCP and UDP, or other protocol, in the same manner as with the processing of the packet No. 1.

Then, in step 802, the routing table 27 is searched for an interface ID 57 having a protocol type 51, local IP address 52, local port number 53, remote IP address 54, and remote port number 55 that agree.

In step 803, the corresponding connection has already been registered for the packet No. 1. Thus, in step 805, the communication interface having received the response packet is checked.

The response packet has been received by the side of the second communication interface. Thus, in step 806, the response packet is passed to the processing of the first communication control software 21 serving for the first communication interface 11.

Finally, with the processing of the first communication control software 21, the response packet is transmitted from the first communication interface 11 to the communication terminal 2a according to the destination IP address of the packet.

Then, when the communication terminal 2a transmits a packet belonging to this connection, the packet is received by the first communication interface 11 of the communication apparatus 1. In the processing of the first communication control software 21 of the first communication interface 11, the packet is passed to the processing of the router software 25.

With the processing of the router software 25, the packet is processed in accordance with the flow of FIG. 8.

The processing of the router software 25 is as follows. Upon reception of the packet, the IP address of the packet is examined in step 801 to determine whether the protocol is one of TCP and UDP, or other protocol, in the same manner as with the processing of the packet No. 1. In step 802, the routing table 27 is searched for an interface ID 57 having a protocol type 51, local IP address 52, local port number 53, remote IP address 54, and remote port number 55 that agree.

In step 803, a coinciding connection has already been registered for the packet No. 1. Thus, in step 805, the communication interface that has received the packet is checked. As the packet has been received by the side of the first communication interface, then in step 807, the packet is passed to the processing of the second communication control software 22, that is, the processing of the second communication control software 22a in this case, which corresponds to the interface ID 57 of the routing table 27.

Finally, the packet is transmitted to the access router 3a by the processing of the second communication control software 22a so that the packet is relayed to the server 4a.

After that, packets belonging to this connection are communicated by the same processing via the route communicating via the access router 3a.

Explanation will now be made on the processing of the connection of the packet No. 2. This connection will be established for implementing the same service as that for the connection of the packet No. 1 and is aimed at having the packet No. 2 relayed to the server 4b being a destination address.

When an application implements the service with using a plurality of connections, the plurality of connections are established at one time at the start of the service. Therefore, the packet No. 2 used for the same service as the packet No. 1 is received by the first communication interface 11 of the communication apparatus 1 shortly after the packet No. 1.

In the processing of the first communication software for the first communication interface 11, the packet No. 2 is passed to the processing of the router software 25 in the same manner as the packet No. 1 is.

In the processing of the router software 25, a process entirely the same as the process for No. 1 is performed in accordance with the flowchart of FIG. 8 to pass the packet No. 2 to the processing of the route determination software 23.

With the processing of the route determination software 23, the packet is processed in accordance with the flowchart of FIG. 9.

The processing of the route determination software 23 is as follows. Upon reception of the packet No. 2, it is checked in step 901 whether the interface that has received the packet is on the side of the first communication interface 11.

The packet No. 2 has been received by the side of the first communication interface 11. Thus, it is checked in step 902 whether the timer operation status 71 of the timer management table 26 of FIG. 7 represents operating.

The timer 15 has already been started to operate by the processing for the packet No. 1. Therefore, unlike with the packet No. 1, the flow advances to step 906 without execution of the processes of steps 903 through 905. Thereafter, the processing entirely the same as the processing for the packet No. 1 is carried out.

Consequently, the same interface ID for the packet No. 1 is set in the selection interface ID of the routing table 27 for the packet No. 2. The packet No. 2 is transmitted to the server 4b via the same access router 3a as for the packet No. 1.

Thereafter, packets belonging to the same connection as the packet No. 2 are processed entirely in the same manner as the packet No. 1 and consequently are all communicated via the access router 3a in the same manner as the packets belonging to the connection of the packet No. 1.

In this manner, connections belonging to the same user session as the packet No. 2 start communication before the timer 15 times out. Hence, all packets are communicated via the same access router 3a as the packet No. 1.

The processing of when the timer 15 times out will now be explained. When the timer 15 times out, the timer software 24 performs processing to change the timer operation status 71 of the timer management table 26 to stopped in accordance with step 1001 of FIG. 10.

After the timer 15 times out, when a connection for a new service, that is, the packet No. 4 of FIG. 4, is received by the communication apparatus 1, a new route is determined by the processing of the route determination software 23 in the same manner as for the packet No. 1. Then, the timer 15 is started. As the new route, a route having a larger margin in communication traffic is selected based on the communication traffic free volume 64 of the second communication interface management table 28. Therefore, the same route as for the packet No. 1, that is, the same access router, may be selected, or another route, that is, another access router may be selected.

When a packet having a protocol other than TCP and UDP is received by the communication apparatus 1, the packet is passed to the processing of the router software 25 by the processing of the first communication control software 21 or by the processing of the second communication control software 22a or 22b. The processing of the router software 25 follows the flow of FIG. 8. It is determined in step 801 that the protocol is other than TCP or UDP. The flow then advances to step 808. In step 808, the communication interface that has received the packet is checked. If the packet has been received by the first communication interface 11, then in step 809, the packet is transmitted to the access router 3a or 3b connected to the corresponding second communication interface 12a or 12b through the processing of the second communication control software 22 corresponding to the second communication interface ID 61 registered at the head of the second communication interface management table 28. If the packet has been received by the second communication interface 12, then in step 810, the packet is passed to the processing of the first communication control software of the first communication interface and transmitted to the communication terminal 2a or 2b indicated by the destination IP address.

In FIG. 4, the packet which starts connection is transmitted by the communication terminal 2a. A case will be explained where the packet is transmitted by the server 4a.

For example, when the server 4a transmits the packet which starts connection to the communication terminal 2a via the access router 3a, a response packet for it must surely be transmitted to the server 4a via the access router 3a due to the following reason. The access router 3a performs address conversion by NAT (Network Address Translation) or NAPT (Network Address Port Translation). If the response packet is transmitted via another access router (the access router 3b in FIG. 1), the server 4a will not be able to recognize the response packet as being a response to the packet it has transmitted.

Therefore, in registration of a connection with the routing table 27 during the processing of the route determination software 23, the second communication interface 12 having received the packet is registered as the interface ID 57 in FIG. 9 (step 909) unlike the packet No. 1 or packet No. 2. In step 910, the packet is passed to the processing of the first communication control software 21. With the processing of the first communication control software 21, the packet is transmitted to a communication terminal (in this case the communication terminal 2a) indicated by the destination IP address of the packet.

As described above, the present invention is provided with the first communication interface 11, the second communication interface 12 connected to the plurality of access routers 3 connected to the Internet 6, and the route determination unit which determines the second communication interface 12 for a packet being relayed from the first communication interface 11 to the second communication interface 12, in accordance with the time having elapsed since connecting start of the connection with the destination of the packet. With using, as information of communication time that can determine the route, an elapsed time since connecting start of a connection from the side of the first interface 11, among the connections, whose head packet is received by the first interface 11, a relay route of another one or a plurality of connections from the side of the first interface 11 which starts connecting within a predetermined time since connecting start of one connection from the side of the first interface 11, is set to be identical with the relay route of the initial connection from the side of the first interface 11. Since connections started within the predetermined time are treated as the connections constituting one user session, all connections constituting the same user session can be communicated via the same access router without the need of analyzing the protocol of an upper layer.

In the above explanation, load distribution is performed based on estimated communication traffic of each connection which is preset by the communication traffic table 29. The same effect can be obtained by finding the communication traffic free volume through measurement of the actual communication traffic of each packet relayed per unit time and determining the route to be used.

Embodiment 2

In Embodiment 1 described above, all connections constituting the same user session are relayed along the same route by sectioning, with using the timer, the time taken since establishment of the plurality of connections constituting the user session is started until establishment of all the connections is ended. An embodiment of a case will now be described wherein the ends of establishment of all connections belonging to the same user session are determined by measuring the intervals at which establishment of the connections is started.

Embodiment 2 has the same configuration as that of Embodiment 1. Except for the following, the processing of Embodiment 2 is the same as that of Embodiment 1.

The processing of route determination software 23 is different from that of Embodiment 1, and accordingly portions that are different from Embodiment 1 will be described.

Figure 11:
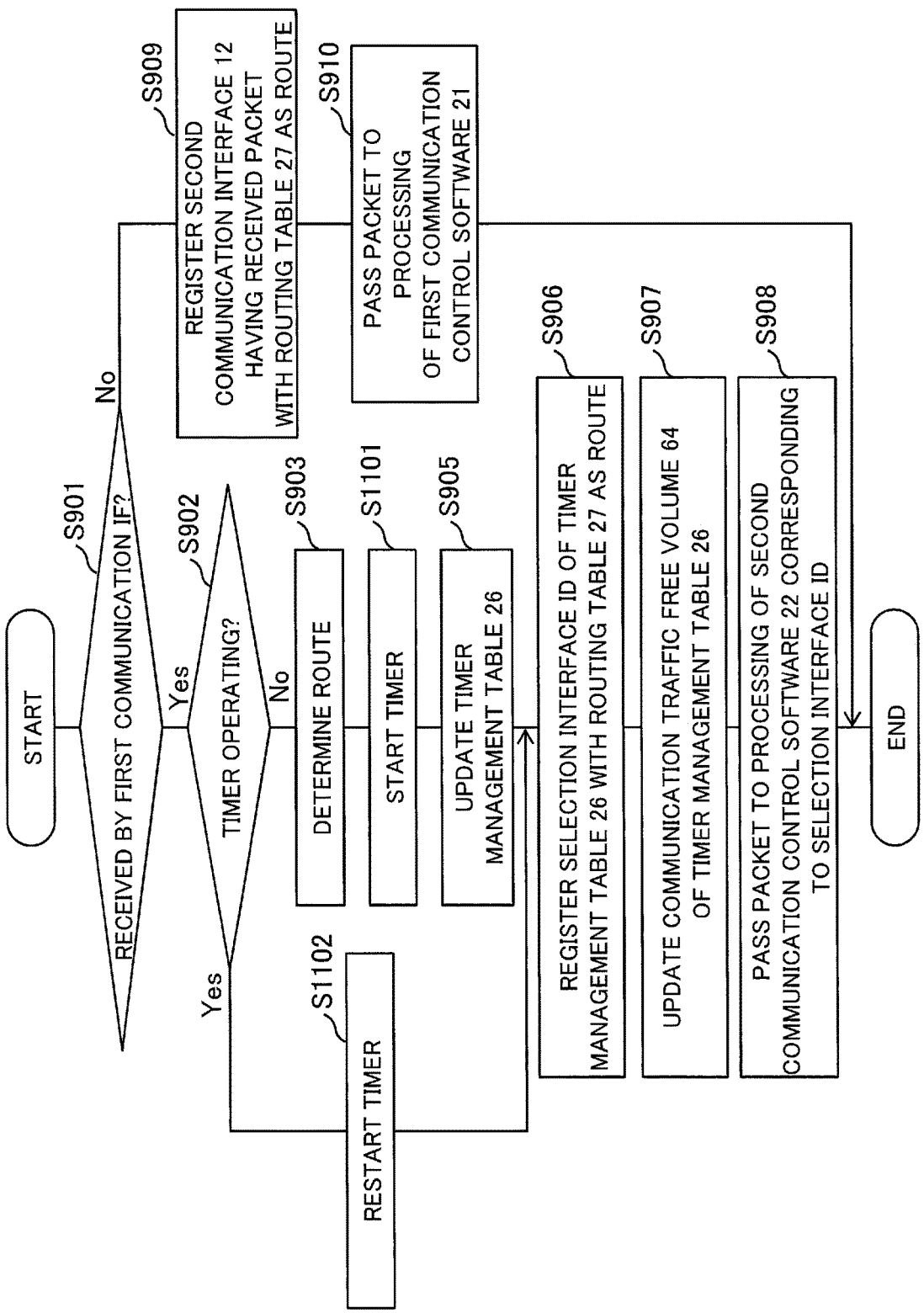
FIG. 11 is a flowchart illustrating processing of route determination software 23 in Embodiment 2.

FIG. 11 illustrates a flowchart of the processing of the route determination software 23 in Embodiment 2. In FIG. 11, the same processes as those of Embodiment 1 are performed in step 901 through step 903 and in step 905 through step 910.

The operation will be described.

Upon start of a user session, first, when a packet No. 1 of FIG. 4 is received by a communication apparatus 1 in the same manner as in Embodiment 1, the packet No. 1 is passed to the processing of the route determination software 23 of FIG. 11 corresponding to FIG. 9 of the case of Embodiment 1 through the processing of router software 25 of FIG. 8. So far the operation is entirely the same as that of Embodiment 1.

In the processing of the route determination software 23, when it is confirmed in step 901 that the packet No. 1 is received by a first communication interface 11, it is then checked in step 902 whether a timer 15 is operating. In the case of the packet No. 1, the timer 15 is stopped, and accordingly the route is determined in step 903. Then, the timer 15 is started in step 1101. At this time, unlike in Embodiment 1, a time during which the head packet of a connection is not received and which allows determination of the end of establishment of a connection belonging to the same user session is set as a prescribed value. Thereafter, the processing takes place in the same manner as in Embodiment 1.

Then, when a packet No. 2 is received by the communication apparatus 1, the packet No. 2 is passed to the processing of the route determination software 23 in the same manner as in Embodiment 1. The processing of the route determination software 23 is performed as follows. Namely, when it is confirmed in step 901 that the packet No. 2 is received by the first communication interface 11 in the same manner as in Embodiment 1, the operation status of the timer 15 is checked in step 902. As the timer 15 is operating, the timer 15 is restarted in step 1102 at the same time as in step 1101. Namely, the time-out time of the timer 15 is extended. Alternatively, the timer 15 may be restarted at different time instead of at the same time as in step 1101. Thereafter, the same processing as that of Embodiment 1 is performed.

Except for this, the processing is entirely the same as in Embodiment 1.

As described above, the present invention is provided with the first communication interface 11, the second communication interface 12 connected to the plurality of access routers 3 connected to the Internet 6, and the route determination unit which determines the second communication interface 12 for a packet being relayed from the first communication interface 11 to the second communication interface 12, in accordance with the time having elapsed since connecting start of the connection with the destination of the packet. When the head packet of another connection is relayed from the first communication interface 11 to the second communication interface 12 within a predetermined time after connecting start of a connection, the measurement time taken since start of establishment of the first connection until the end of start of establishment of all connections is extended, so that establishment of a new connection is not started within the predetermined time. In this case, it is determined that establishment of a connection for one user session is ended. Therefore, all connections constituting the same user session can communicated via the same access router without the need of analyzing the protocol of an upper layer.

More specifically, as information of the communication time that can determine the route, when the elapsed time since the connecting start of the connection from the side of the first interface 11 until the connecting start of the next connection from the side of the first communication interface 11 falls within a predetermined time, the route determination unit determines the second communication interface such that the connection from the side of the first interface 11 which has started connecting afterwards is relayed along the same relay route as that of the connection from the side of the immediately preceding first interface 11. Thus, all connections constituting the same user session can be made to communicate via the same access router without the need of analyzing the protocol of an upper layer.

Embodiment 3

In Embodiment 1 and Embodiment 2 described above, load distribution is performed by identifying the user session at the time establishment of the connection is started. An embodiment will now be described in which load distribution is performed for each application in addition to identifying the user session at the time establishment of a connection is started. Explanation will be made only on a portion that is added to processing of an operation of performing load distribution for each application as a result of some switching, although the same structure and operation as those of Embodiment 1 are basically possible.

The hardware configuration of Embodiment 3 is the same as that of Embodiment 1.

Figure 12:
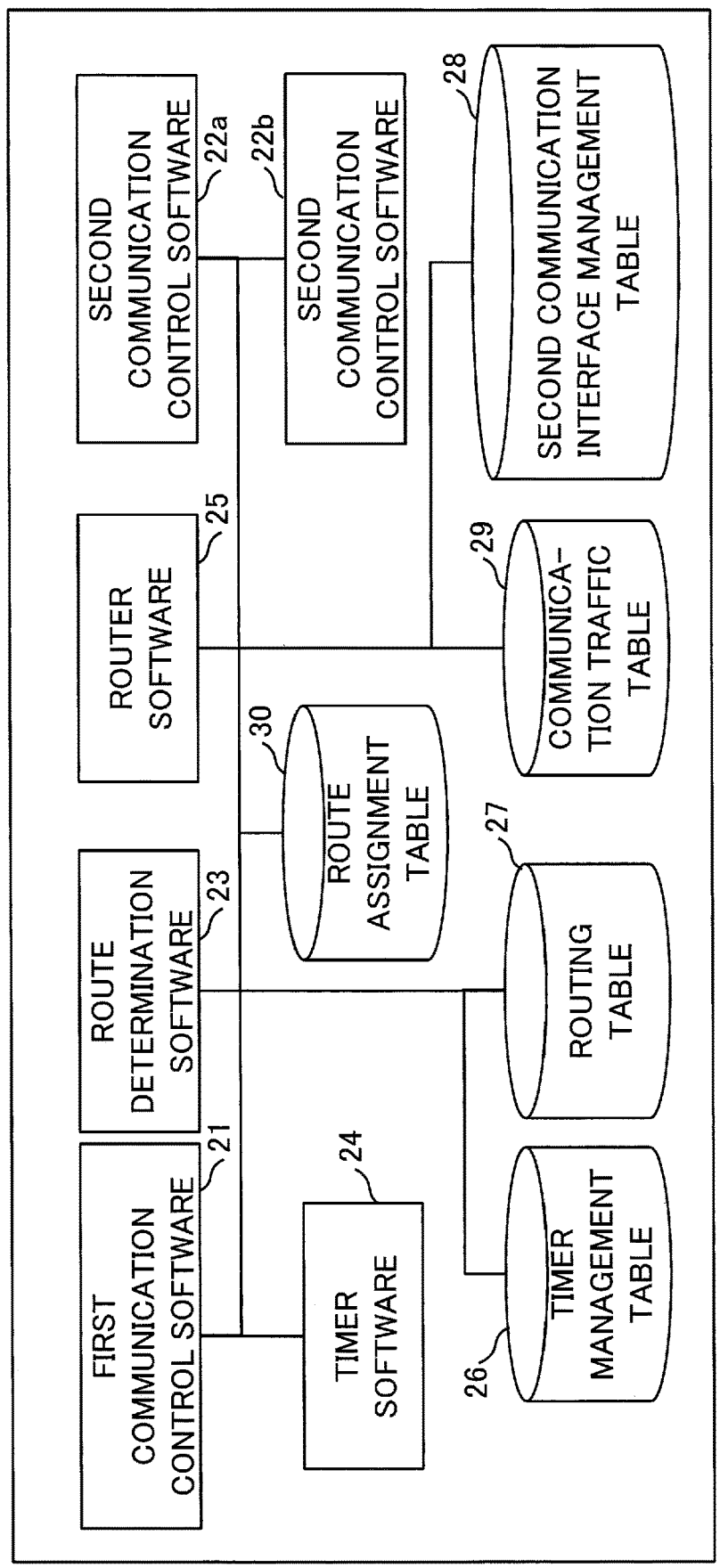
FIG. 12 is a software configuration diagram of a communication apparatus 1 in Embodiment 3.

FIG. 12 is a software configuration diagram of Embodiment 3. A route assignment table 30 is added when compared with Embodiment 1.

The route assignment table 30 is a table where a second communication interface 12 for use by each well-known port number of the connection is written in advance.

FIG. 13 is a diagram illustrating the route assignment table 30 of Embodiment 3. As a port number 131, a well-known port number used by TCP or UDP is written. A selection interface ID 132 is the interface ID of the second communication interface 12 to be used by a connection that uses the port number 131. Note that the route assignment table 30 is provided with values as parameters in advance.

The operation will be described.

FIG. 14 is a flowchart illustrating processing of route determination software 23 in Embodiment 3.

When the user session is started, first, a packet No. 1 of FIG. 4 is received by a communication apparatus 1 in the same manner as in Embodiment 1 and passed to the processing of the route determination software 23 by the processing of router software 25. So far the operation is entirely the same as in Embodiment 1.

The processing of the route determination software 23 is as follows. When it is confirmed in step 141 that the packet No. 1 is received by a first communication interface 11, the route assignment table 30 is searched in step 142 for a destination port number and a source port number to check if there is a port number that agrees. In step 143, if there is a port number that agrees on the route assignment table 30, then in step 144, the corresponding selection interface ID of the route assignment table 30 is registered with a routing table 27 as a relay destination. In step 143, if there is no port number that agrees on the route assignment table 30, then in step 145, the head second communication interface 12 of a second communication interface management table 28 is registered with the routing table 27 as a relay destination. Then in step 146, the packet is passed to the processing of second communication control software 22 corresponding to the interface ID registered with the routing table 27. Thereafter, the packet is processed in the same manner as in Embodiment 1.

Other than this, the processing is entirely the same as in Embodiment 1 except that a time-out process is not performed.

As described above, the present invention is provided with the first communication interface 11, the second communication interface 12 connected to a plurality of access routers 3 connected to the Internet 6, the route assignment table 30 indicating correspondence between the port number and the second communication interface 12 which corresponds to one of the plurality of access routers 3, and a route determination unit which determines, as the relay route, the second communication interface 12 registered with the route assignment table 30 for a port number or an IP address, as the relay route of the connection from the side of the first interface 11 which agrees with the port number or IP address registered with the route assignment table 30, regardless of the information of the time of the communication. For a connection that uses a port number registered in advance, an interface which is determined in advance by taking load distribution into consideration is used. For connections each using an unregistered unknown port number, one interface is used for all of them. Therefore, load distribution is performed without the need of analyzing the protocol of an upper layer. Also, connections constituting the same user session can be communicated via the same access router.

Embodiment 1 through Embodiment 3 described above will be summarized as follows. It suffices as far as a second interface can be determined which corresponds to one of the plurality of access routers 3 with using information of time or connecting of communication that can determine a route for a packet relayed from the first communication interface 11 to the second communication interface 12 without using information of an upper layer.

In Embodiment 1 through Embodiment 3, session start time or port numbers are used.

The same effect can be obtained if, as information that can determine the route without using the information of the upper layer, the port number of Embodiment 3 is changed to an IP address. In Embodiment 1, during a predetermined time after the connection is started, the second communication interface is determined based on the communication traffic free volume. Alternatively, while basically following Embodiment 1, route selection based on the port number or IP address may be performed when the communication traffic free volume becomes equal to or lower than a predetermined value.

The present invention is provided with the first communication interface 11, the second communication interfaces 12 connected to the plurality of access routers 3 connected to the Internet 6, and the route determination unit which determines, as a relay route, the second communication interface 12 corresponding to one of the plurality of access routers 3, with using information of time or connecting of communication that can determine a route when a head packet indicating connecting start of the connection relayed by using the first communication interface 11 and one of the plurality of second communication interfaces 12 is received. Therefore, load distribution is performed without the need of analyzing the protocol of an upper layer. Also, connections constituting the same user session can be communicated via the same access router.

REFERENCE SIGNS LIST

1: communication apparatus; 2*a*: communication terminal; 2*b*: communication terminal; 3*a*: access router; 3*b*: access router; 4*a*: server; 4*b*: server; 5: local network; 6: Internet; 11: first communication interface; 12*a*: second communication interface; 12*b*: second communication interface; 13: CPU; 14: RAM; 15: timer; 16: ROM; 21: first communication control software; 22*a*: second communication control software; 22*b*: second communication control software; 23: route determination software; 24: timer software; 25: router software; 26: timer management table; 27: routing table; 28: second communication interface management table; 29: communication traffic table; 30: route assignment table; 51: protocol type; 52: local IP address; 53: local port number; 54: remote IP address; 55: remote port number; 56: communication traffic; 57: interface ID; 61: second communication interface ID; 62: type; 63: communication speed; 64: communication traffic free volume; 71: timer operation status; 72: selection interface ID; 131: port number; 132: selection interface ID

The invention claimed is:

1. A communication apparatus comprising:
    a first communication interface connected to a local network;
    one or a plurality of second communication interfaces connected to a plurality of access routers connected to an Internet; and
    a processor, where a first connection is relayed by using the first communication interface and said one second communication interface or one of the plurality of second communication interfaces and constituted between one terminal on the local network and one terminal on the Internet, to determine whether a second connection, started after the first connection, is to be relayed using the second communication interface which is the same as the second communication interface being employed for establishing the first connection, by using information specifying an amount of time that has elapsed since a start of the first connection,
    wherein the processor, by using, as information of communication time that can determine the route, an elapsed time since connecting start of a connection from a side of the first interface, among the connections, whose head packet is received by the first communication interface, determines the second communication interface such that a relay route of another one or a plurality of connections from a side of the first interface which starts connecting within a predetermined time since connecting start of one connection from a side of the first interface, is set to be identical with the relay route of the initial connection from the side of the first interface.

2. The communication apparatus according to claim 1, wherein, as information of the communication time that can determine the route, when the elapsed time since the connecting start of the connection from the side of the first interface until the connecting start of the next connection from the side of the first interface falls within a predetermined time, the processor determines the second communication interface such that the connection from the side of the first interface which has started connecting afterwards is relayed along the same relay route as that of the immediately preceding connection from a side of the first interface.

3. The communication apparatus according to claim 1, further comprising a route assignment table indicating correspondence between a port number or an IP address and the second communication interface which corresponds to one of the plurality of access routers,
   wherein the processor determines, as the relay route, the second communication interface registered with the route assignment table for the port number or the IP address, as the relay route of a connection from the side of the first interface which agrees with the port number or the IP address registered with the route assignment table, regardless of the information of the time of the communication.

4. The communication apparatus according to claim 2, wherein the head packet indicating connecting start of the connection is a SYN packet of TCP.

5. The communication apparatus according to claim 1, wherein a communication traffic per unit time of each of the plurality of second communication interfaces is measured, and the second communication interface which is employed by a connection which has started communication newly, from the side of the initial first interface is determined based on the measured communication traffic.

6. The communication apparatus according to claim 1, further comprising a routing table where a destination IP address, a source IP address, a destination port number, and a source port number are related to one of the plurality of second communication interfaces connected to one of the access routers,
   wherein a route is determined when the first communication interface receives a SYN packet of TCP or an UDP packet which is unregistered with the routing table, and information of the destination IP address, the source IP address, the destination port number, the source port number, and the connected second communication interface are stored in the routing table.

7. A communication method comprising determining, where a first connection is relayed by using a first communication interface connected to a local network, a plurality of access routers connected to an Internet, and one second communication interface or one of a plurality of second communication interfaces and constituted between one terminal on the local network and one terminal on the Internet, whether a second connection, started after the first connection is to be relayed using the second communication interface which is the same as the second communication interface being employed for establishing the first connection, by using information specifying an amount of time that has elapsed since a start of the first connection,
   wherein, by using, as information of communication time that can determine the route, an elapsed time since connecting start of a connection from a side of the first interface, among the connections, whose head packet is received by the first communication interface, determining the second communication interface such that a relay route of another one or a plurality of connections from a side of the first interface which starts connecting within a predetermined time since connecting start of one connection from a side of the first interface, is set to be identical with the relay route of the initial connection from the side of the first interface.

* * * * *